J. BECKER.
TRANSMISSION MECHANISM.
APPLICATION FILED NOV. 20, 1909. RENEWED AUG. 21, 1911.
1,004,732.
Patented Oct. 3, 1911.
2 SHEETS—SHEET 2.
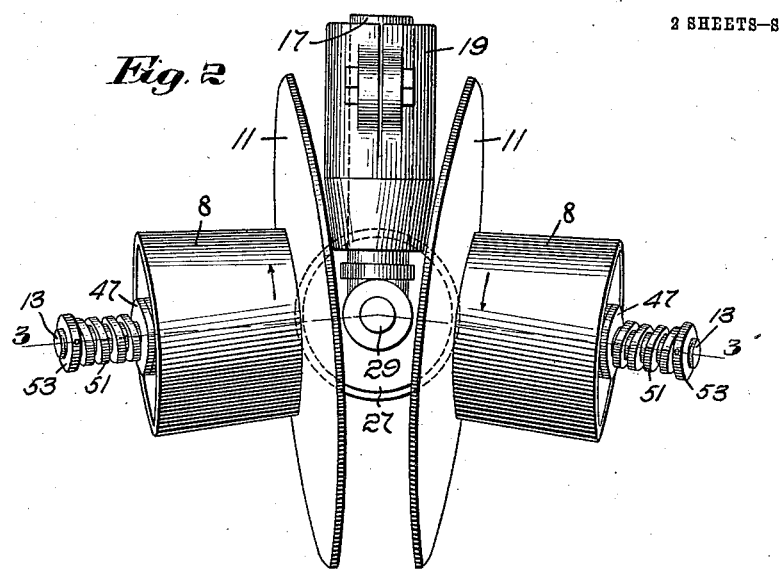
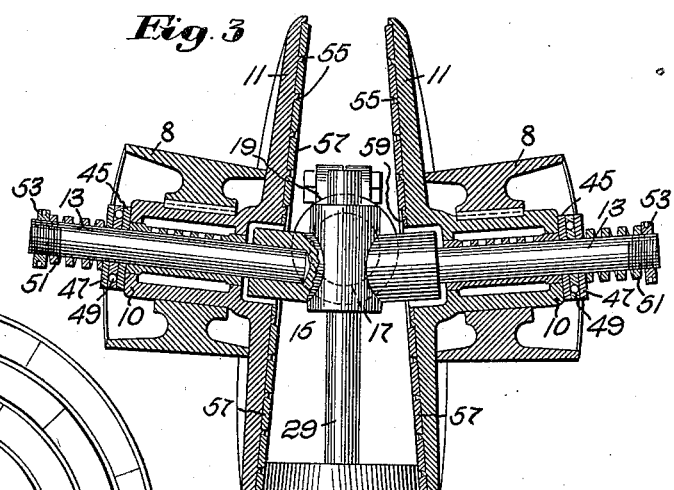
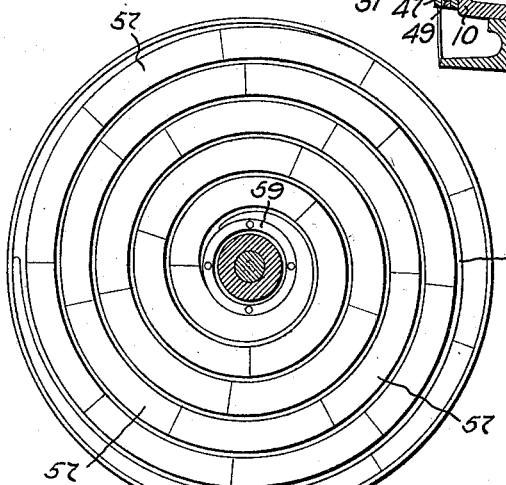
Witnesses:
Horace A. Crossman
Robert H. Kammler
Inventor:
John Becker,
by Emery & Booth
Attys.

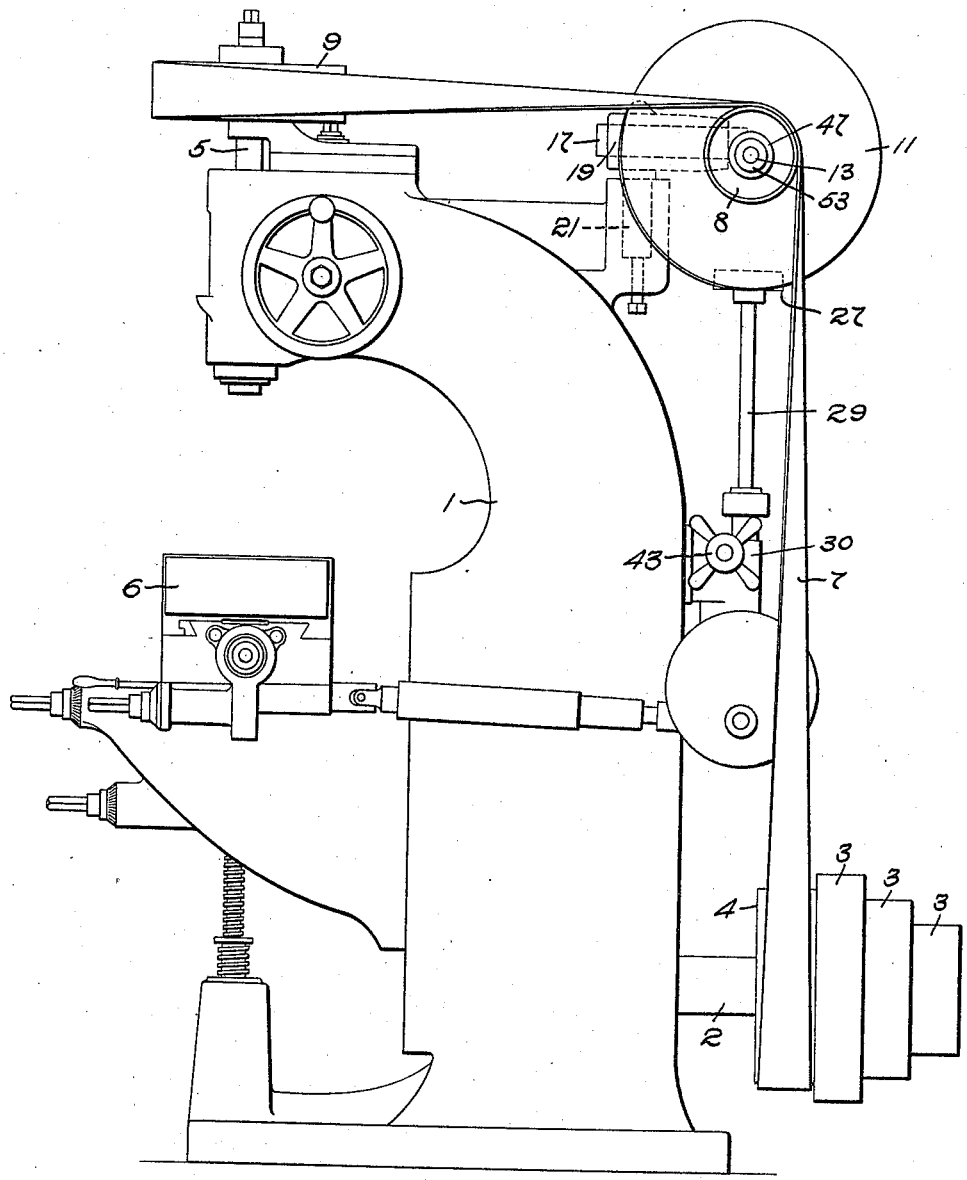

UNITED STATES PATENT OFFICE.

JOHN BECKER, OF HYDE PARK, MASSACHUSETTS.

TRANSMISSION MECHANISM.

1,004,732.     Specification of Letters Patent.     Patented Oct. 3, 1911.

Application filed November 20, 1909, Serial No. 529,054. Renewed August 21, 1911. Serial No. 645,244.

*To all whom it may concern:*

Be it known that I, JOHN BECKER, a citizen of the United States, and a resident of Hyde Park, in the county of Norfolk and State of Massachusetts, have invented an Improvement in Transmission Mechanism, of which the following description, in connection with the accompanying drawings, is a specification, like letters on the drawings representing like parts.

This invention aims to provide a novel and improved friction gearing or transmission mechanism, particularly adapted for use in connection with a variable gearing for producing varying speeds, and the invention consists in certain features and combinations of elements to be hereinafter more particularly described and pointed out in the claims.

The invention comprises a mechanism of the type shown in my co-pending application, Serial No. 461,704, filed November 9, 1908.

For the purpose of disclosing my invention I have here illustrated it in connection with a typical vertical milling machine, although it is to be understood that I have so disclosed my invention for illustrative purposes merely, the invention itself being unrestricted in its application and use.

Referring to the drawings: Figure 1, in side elevation, shows in outline a vertical milling machine equipped with friction transmission mechanism illustrating one embodiment of my invention; Fig. 2, on an enlarged scale, shows in top or plan view the transmission mechanism proper; Fig. 3, is a vertical section on the irregular line 3—3 of Fig. 2; and Fig. 4 is a detail showing in face view one of the friction elements.

In the drawings, referring first to Fig. 1, the milling machine 1, of usual or desired type, is employed merely as typifying any machine or use to which my invention is adapted, said machine in the present instance being provided near its base with a horizontal stud 2, on which are mounted the stepped, driving pulleys 3 and the main transmission pulley 4, said machine at or near its upper end having mounted in the overhanging arm a usual vertical spindle 5 to which the tool is secured. The work support is indicated at 6 and is of usual construction and may be provided with automatic movement as more fully hereinafter described. The vertical spindle 5 is driven from the main transmission pulley 4 by a belt 7 extended upward and over two lead pulleys 8 thence over to and about a pulley 9 fast on said spindle.

My present invention has special reference to the mechanism immediately adjacent the lead pulleys 8. These pulleys in themselves are not new herein, they having been heretofore commonly used as mere idlers or guide pulleys for leading the belt from the vertical to the horizontal runs thereof, but I have herein utilized said lead pulleys as members of my improved friction transmission mechanism which I will now more particularly describe. The said lead pulleys 8 (see Fig. 3) are shown as mounted upon the hubs 10 of friction disks 11, more fully hereinafter described, said hubs in turn being mounted loosely upon the laterally extended studs 13 pitched slightly upward and rearward as shown and secured at their inner adjacent ends in a socketed connection 15. This connection (see Figs. 1 and 2) is provided with a forwardly and horizontally extended arm 17 which is adjustably held in a split socket 19 on the upper end of a vertical arm 21 which in turn is vertically adjustable in a portion of the machine frame. The adjustments referred to permit of adjustment of the pulleys 8 to any desired vertical, horizontal or even angular position to tighten the belt 7 or for any other purpose desired.

Between the friction disks 11 (see Fig. 3) and as shown herein below the studs 13 upon which the pulleys 8 are mounted, is arranged a driven wheel or transmission element 27. This wheel may conveniently be of metal or with a smooth and preferably frusto-conical metal periphery, and in this instance said wheel is mounted fast on a vertical shaft 29, journaled at its upper end in the connection 15 and at its lower end in a vertical bearing 30 on the frame 1, as more fully hereinafter described. The diameter of this driven wheel 27 is such as preferably to extend from one to another of the friction disks 11 which are thereby permitted to bear frictionally upon and at diametrically opposite points of the said friction driven wheel 27.

The adjustment of the vertical shaft 29 or of the driven element 27 thereon may be effected in any suitable manner. Herein the shaft 29 is free to rotate in a sleeve 31 but is moved longitudinally therewith by a collar 33 pinned to said shaft and mounted between ball bearings in an enlargement of said sleeve. The sleeve 31 is mounted in a portion of the machine frame and is free to slide therein but is prevented from rotative movement by a pin 35 received by a longitudinal slot 37 on said sleeve. The sleeve may be moved vertically by a pinion 39 meshing with a rack 41 extending longitudinally of said sleeve 31, the shaft carrying said pinion being provided with a suitable handwheel 43 (Fig. 1).

The driving belt 7 in transmitting motion from the main transmission pulley 4 to the vertical spindle 5 imparts opposite rotation to the lead pulleys 8 thereby constituting said lead pulleys driving pulleys or wheels for the transmission mechanism. The friction disks 11 are thereby constituted driving disks or elements of the transmission mechanism they being rotated in opposite directions as indicated in Fig. 2, and since they bear upon the driven wheel or element 27 at opposite points thereof said driven element and its shaft 29 will be rotated to transmit motion to any desired part or parts or for any desired purpose according to the character of the connections with or to the shaft 29. Said shaft may be utilized to transmit the feed to the work table through suitable connections not shown in detail herein.

It is a well-known mechanical fact that a moving belt passing over the periphery of a pulley whether such pulley be an idler or driving pulley, tends constantly to creep to the highest point or largest diameter of said pulley. In the construction herein shown (see Figs. 2 and 3) the oppositely moving lines of the belt 7 tend constantly to creep toward the outer higher ends, which may also be ends of larger diameter or may be conical ends of the lead pulleys 8, but because said belt leads from the main transmission pulley 4 at the lower rear end of the machine to a pulley herein of substantially the same diameter upon the vertical spindle 5, said belt tends constantly to pursue substantially direct paths from one to the other of said pulleys, and instead of creeping outwardly and upwardly upon the inclined or pitched surfaces of the pulleys 8, causes said pulleys by the action above referred to, to be drawn constantly toward each other. This causes the friction disks 11 to be pressed constantly and frictionally upon the intervening driven wheel or element 27 and since the effort of the belt to pursue the most direct lines between the driving and driven pulleys 4 and 9 increases with the load being driven thereby, it follows that the greater the load imposed upon the vertical spindle 5 and its pulley 9 and the greater the effort required on the part of the belt 7 to rotate the same, the greater will be the action upon the lead pulleys 8 to draw the same toward each other and to bear frictionally upon the driven wheel 27, consequently, the greater will be the power transmitted to and through said driven wheel.

While the pressure of the driving disks 11 upon the intervening driven wheel 27 is automatic as described above, increasing and decreasing in its action and varies herein according as the load imposed upon the belt 7 is increased or decreased, I have provided additional means for creating desired friction. Referring to Fig. 3 the outer ends of the hubs 10 of the disks 11 are fitted with washers 45 between which and opposed washers 47 are arranged suitable anti-friction devices, such, for instance, as ordinary balls 49 spaced in desired manner. The outermost washers 47 are acted upon by helical springs 51 which in turn are adjusted by nuts 53 threaded upon the outer ends of said studs 13. These nuts, springs and ball bearings constitute convenient means for furnishing positive or manual adjustment of the friction with which the driving disks are held in operative contact with the driven element and the said manual and automatic adjusting means may be used independently or the one supplementing the other as herein, as may be desired in any particular case.

It is a well-known fact that wherever variable speed friction transmission disks are used there is greater liability of slip between said disks when the driven disk is running near the axis of the driving disk for low speeds and at such times the drive is often effected with much less certainty and power than when said driven disk is running near the periphery of the driving disk to furnish higher speeds. By my invention instead of less power for low speeds, even greater power of transmission may be obtained. I will now describe the arrangement and construction whereby this increased power is effected. The opposed driving disks are not formed to present parallel face portions beneath their axes, as in my said co-pending application, but, on the contrary, said portions are relatively inclined or converged from their outer edges toward their axes, the driven or intervening disk being frusto-conical to conform to the inclination of said disks.

It will be apparent that as the driven disk is adjusted along the converged faces of the driving disks toward their axes of rotation the said disks will be spread against the axial pressure on said disks which is effected by said belt and pulleys, or said springs, using either one or both as desired. As the disks 11 are spread by this adjustment the driving pulleys 8 will slide farther out toward the ends of their tilted supporting studs 13 and will divert the belt from the lines of its normal runs between the pulleys 4 and 9 and also tighten the belt 7. The effort of the belt constantly to draw the pulleys or disks inwardly is therefore much greater than when said pulleys are permitted to approach more closely, as when the driven disk 27 is adjusted for higher speeds toward the peripheries of the disks 11 as shown in Fig. 3. This is found to be a very advantageous construction since the described increase in pressure effectually prevents the slip which has heretofore commonly existed when the disks are adjusted near to the axes of the driving disks for low speeds and furthermore, the increase in pressure occurs automatically and simultaneously with the reduction or variation in speed.

One of the important features of the invention disclosed in my said co-pending application related to the sectional faced disks by means of which the permanency and efficiency of the mechanism was largely increased. In my said application the sections of leather or other friction face material were illustrated as arranged in concentric rings, and in the descriptive part of the specification of said application I stated that the segregation of the friction faces into generally ring-like areas was "most conveniently and perhaps most effectively and efficiently obtained by its formation in separate and preferably continuous concentric rings, although any other desired construction that will produce the substantial results thereof may be employed, and this whether the sectional portions, of whatever length, be parts of true circles or spiral or otherwise non-circular", and, while the claims in said co-pending application are intended to be generic to all the forms or modifications specifically referred to or comprehended by the disclosure therein, I desire in the present application to claim specifically one or more of the features that are herein included and which are included within the terms of the claims in said co-pending application. For example, the sections, instead of being endless as in the illustrated construction of my said co-pending application, are herein shown as of determinate length and abutting end to end in a generally circular direction around the axis of the disk, or more nearly to a circular than to a radial direction. While the length of any section is not necessarily important, I prefer to use sections of as great length as may be possible and permit them at the same time to be economically cut from such leather or friction material as may be most economically obtained in the market. Whereas also in my said co-pending application the sections are illustrated as arranged in the form of concentric rings, in my present application I have shown the same as arranged in a generally spiral direction, presenting however, substantially the same general circular direction around the axis of rotation contradistinguished from a truly radial direction, that is illustrated in my said co-pending application. While it is important that the friction face of the disk present along a given radius surface sections of friction material, it is for many uses, as stated in said co-pending application, substantially unimportant whether those sections be parts of true circles or spiral, and if spiral whether parts of one and the same spiral or of different spirals. I have found it convenient here to illustrate, and prefer to use, an arrangement in the general direction of a single long spiral, and have illustrated such construction in the accompanying drawings, although obviously my invention is not limited in this respect.

The spirally arranged friction face material described may be retained in the faces of the disks in any suitable manner. Herein the faces of the disks 11 (see Figs. 3 and 4) are provided with spiral and preferably dovetailed or undercut ribs or projections 55 between which are inserted the spiral-like portions 57 of leather or other material. For convenience in manufacture, the innermost rib may be in the form of a separate ring 59 which may be screwed or otherwise secured to its disk.

It is not necessary that the spiral-like ribs or projections 55 be dovetailed in cross section as shown. It is nevertheless of advantage, because the leather material arranged in the grooves or recesses between said ribs is pressed by the frictional action thereon into and to fill the undercut portions of the grooves thereby to become firmly located therein and secured to the metallic disk 11 that supports the same. Since the direction of travel of contact between the driven wheel 27 and the driving disk 11 is in a substantially circular path around said disk, this action being substantially in the direction of the lengths of the spirals of friction material, has been found not unduly to stretch the same lengthwise nor to loosen the engagement thereof with the supporting material or the intervening ribs but, on the contrary, such action appears to compact such material more firmly and closely in position. The intervening disk is preferably made wider than the width of one of the portions 57 referred to and may simultaneously engage a plurality of said portions.

It is convenient to employ two driving disks as herein with an interposed, single driven member operated thereby because, among other things, the opposed action of the driving disks upon the opposite side of the driven member tends to eliminate side friction upon the bearings for the latter but it is, of course, apparent that one of the driving disks might be used without the other and with excellent results and instead of constituting the opposed disks the driving elements and the between-wheel the driven element, the arrangement might be reversed and the wheel 27 in some instances might constitute the driving element and the disk or disks 11 the driven element or elements of the mechanism. I prefer, however, the arrangement shown.

Having described one embodiment of my invention without limiting myself thereto, what I claim as new and desire to secure by Letters Patent is:

1. A friction transmission mechanism comprising, in combination, a rotative element having a face containing along a radius thereof spirally arranged surface sections of friction material and a rotative element in frictional engagement with said sectional face.

2. A friction transmission mechanism, comprising, in combination, a rotative element having a face containing along a radius thereof spirally arranged surface sections of friction material, said element having means to secure said sections to said element, and a rotative element in frictional engagement with said sectional face.

3. A friction transmission mechanism comprising, in combination, a rotative element having a face containing along a radius thereof spirally arranged surface sections of friction material, and a rotative element of a width sufficient simultaneously to engage a plurality of said sections.

4. A friction transmission device comprising, in combination, a plurality of frictionally engaging elements, one of which is provided with a spiral recess having undercut walls and friction material arranged in said recess and retained by said walls.

5. A friction transmission mechanism comprising, in combination, a rotative element having a face containing along a radius thereof arcuate lengths of spirally arranged surface sections of friction material, and a rotative element in frictional engagement with said face.

6. A friction transmission mechanism comprising, in combination, a rotative element having a face containing along a radius thereof spirally arranged surface sections of friction material, a rotative element in frictional engagement with said sectional face and adjustable relatively thereto to provide different speeds of transmission.

7. A friction transmission device comprising, in combination, relatively adjustable frictionally engaging elements; and driving means for one of said elements tending to thrust the same axially into engagement with the other element, said elements being relatively positioned to increase the pressure between them as one is adjusted toward the axis of the other.

8. A friction transmission device comprising, in combination, a plurality of relatively adjustable, frictionally engaging elements, a driving pulley having a pitched surface and secured to one of said elements, a transmission belt coöperating with said pitched surface, said elements being arranged to cause an axial pressure of one toward the other increasing as one is adjusted toward the axis of the other.

9. A friction transmission mechanism comprising, in combination, relatively adjustable frictionally engaging elements; driving means for one of said elements tending to press the same into frictional engagement with another of said elements, and means for causing speed-varying relative adjustment of said elements to vary the frictional engagement between them.

10. A friction transmission device comprising, in combination, frictional driving means; frictionally engaging driving and driven elements driven thereby, said driving element having its axis obliquely related to said driving means and a face oblique to the axis of said driven element, said driving element through its obliquity with respect to said driving means automatically pressing said elements into engaging contact; and means to adjust one of said elements along the face of the other to provide different speeds of transmission.

11. A friction transmission device comprising, in combination, a plurality of opposed, obliquely related disks and an intervening disk adjustable along the faces of said disks and adapted to slide said obliquely related disks axially.

12. A friction transmission device comprising, in combination, a plurality of opposed, axially movable elements having obliquely related faces, an intervening element adjustable along said oblique faces of said elements and adapted to move the latter axially and means tending to force the latter against said intervening element.

13. A friction transmission device comprising, in combination, driving and driven elements, one of which is provided with a face containing spiral sections of friction material, the axis of one of said elements being oblique to the axis of the other.

14. A friction transmission device comprising, in combination, a plurality of opposed disks each having a face containing spiral sections of frictional material, an intervening, coöperating disk and driving means arranged automatically to maintain frictional engagement of said disks.

15. A friction transmission device comprising, in combination, a plurality of opposed, obliquely related disks, each having a face containing spiral sections of frictional material, an intervening, coöperating disk, driving means arranged automatically to maintain frictional engagement of said disks and means to adjust said intervening disk along the faces of said opposed disks and simultaneously move the latter toward or from one another.

16. A friction transmission device comprising, in combination, a frame, a socket thereon, opposed stud shafts projecting outwardly and upwardly from said socket, disks having converged faces and mounted on said shafts, driving pulleys for said disks a belt coöperating with said pulleys tending to thrust them axially toward one another and an intervening friction disk separating said opposed disks and adapted to be adjusted along their converged faces to permit said opposed disks to approach or recede one from another and obtain various speeds of transmission.

17. A friction transmission device comprising, in combination, a belt; means to cause the same to tend to pursue a predetermined path; a pulley tending to divert said belt from its path and pressed axially thereby; an element rotated by said pulley; an element in frictional engagement with said first named element; and means to adjust one of said elements relatively to the other and arranged with respect thereto to thrust the same axially and tend to divert said belt from said path and thereby add to the frictional engagement of said elements.

18. A friction transmission device comprising, in combination, a belt; means to cause the same to tend to pursue a predetermined path; opposed, axially movable pulleys driven by said belt; elements having diverging faces rotated by said pulleys; a common element frictionally engaging said rotative elements; and means to adjust said common element toward the axes of said rotative elements and thereby spread the latter, thrust said pulleys away from one another and thereby add to the frictional engagement of said elements.

In testimony whereof, I have signed my name to this specification, in the presence of two subscribing witnesses.

JOHN BECKER.

Witnesses:
HENRY T. WILLIAMS,
IRVING U. TOWNSEND.

Copies of this patent may be obtained for five cents each, by addressing the "Commissioner of Patents, Washington, D. C."